C. A. PARSONS.
THRUST BEARING.
APPLICATION FILED JUNE 2, 1913.

1,207,071.

Patented Dec. 5, 1916.
3 SHEETS—SHEET 1.

WITNESSES
H. L. Alden
R. C. Curand

INVENTOR
Charles A. Parsons
BY Spear, Middleton, Donaldson & Spear
ATTORNEY

UNITED STATES PATENT OFFICE.

CHARLES ALGERNON PARSONS, OF NEWCASTLE-UPON-TYNE, ENGLAND.

THRUST-BEARING.

1,207,071.  Specification of Letters Patent.  Patented Dec. 5, 1916.

Application filed June 2, 1913. Serial No. 771,362.

*To all whom it may concern:*

Be it known that I, CHARLES ALGERNON PARSONS, K. C. B., a subject of the King of Great Britain and Ireland, and residing at Heaton Works, Newcastle-upon-Tyne, in the county of Northumberland, England, have invented certain new and useful Improvements in Thrust-Bearings, of which the following is a specification.

This invention relates to thrust and other bearings of the type in which one of the bearing surfaces is formed of a number of bearing or pressure blocks pivotally supported upon a carrying member.

The object of the present invention is to provide a form of such bearings in which the pressure is more uniformly distributed over the bearing or pressure blocks than has been possible hitherto, and also to obtain other advantages.

The invention consists in a thrust or other bearing in which the bearing or pressure blocks supported from a carrying member are capable of movement about any axis passing through their point of support.

The invention also consists in the thrust and other bearings as hereinafter described.

Figure 1:
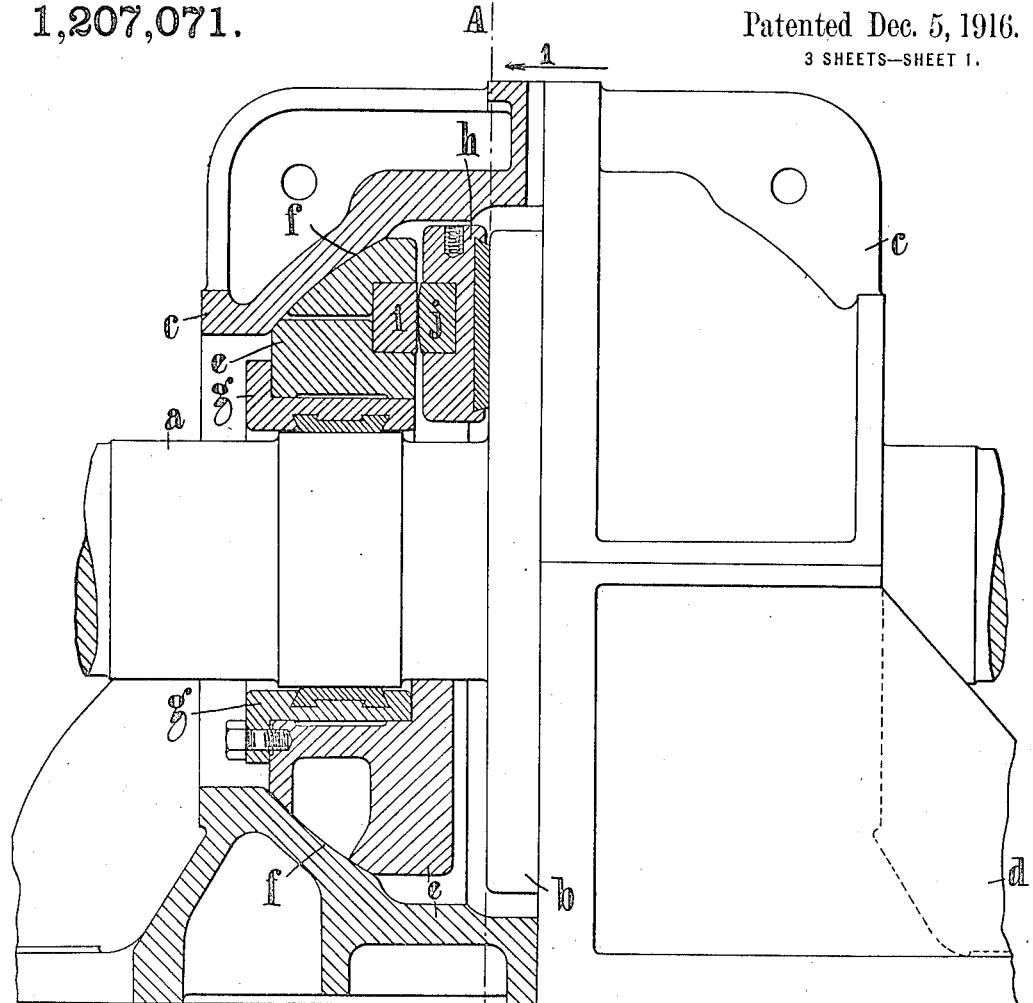
Figure 3:
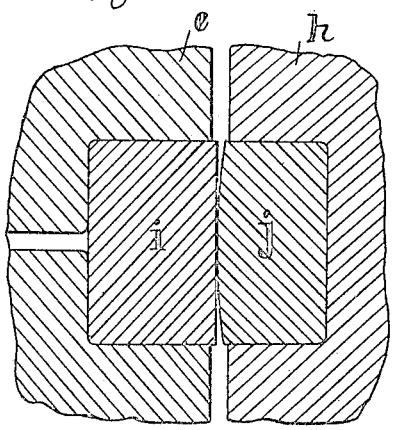
Figure 2:
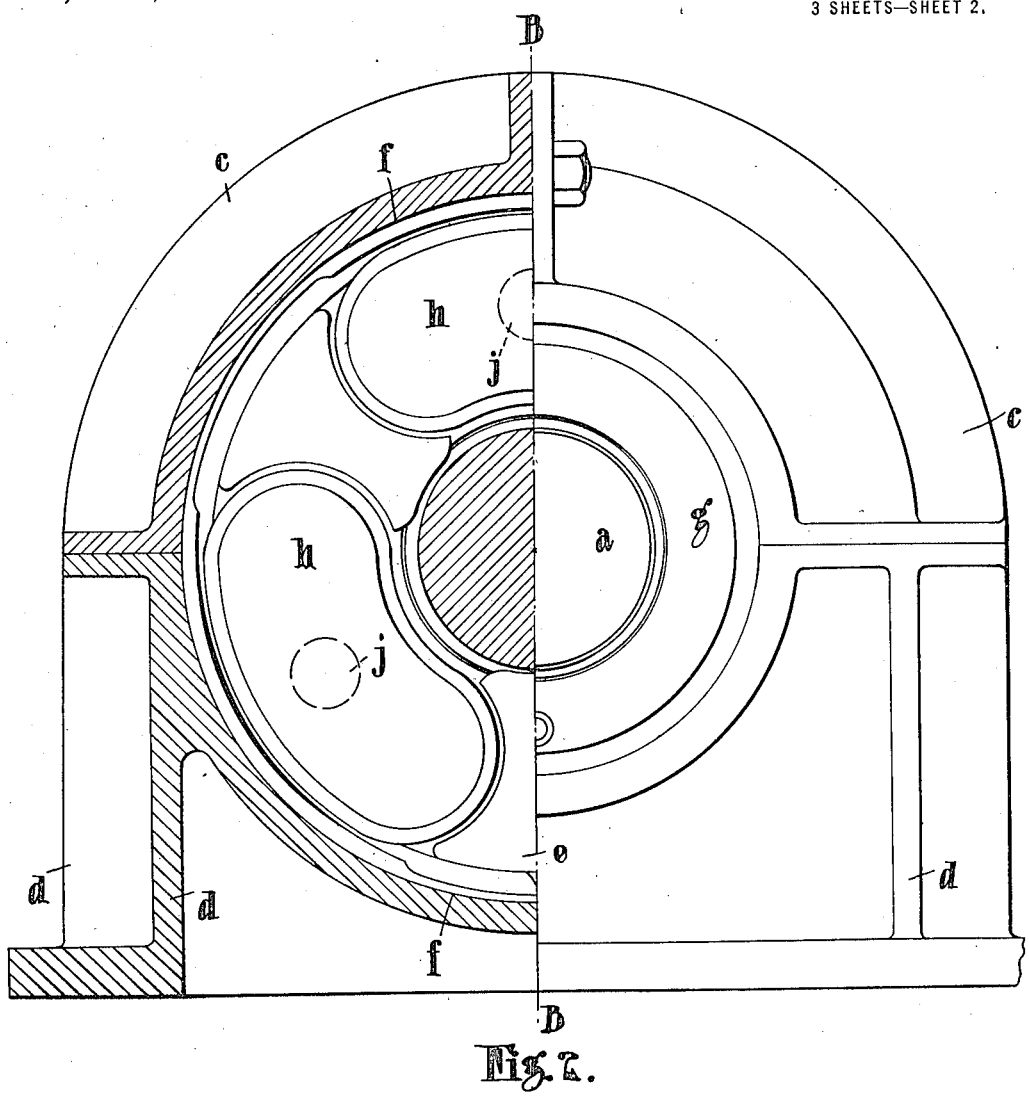
Figure 4:
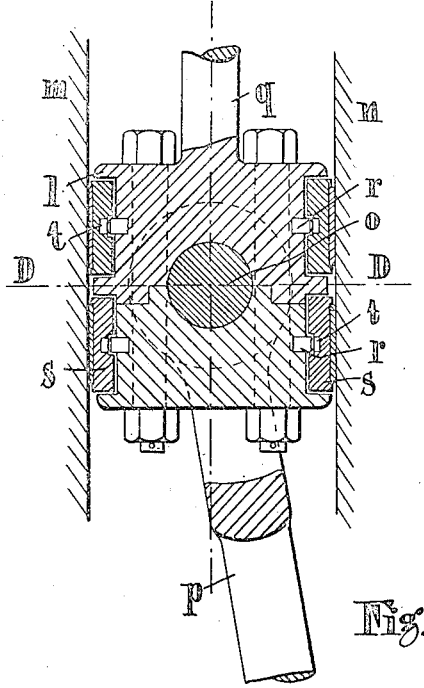
Figure 6:
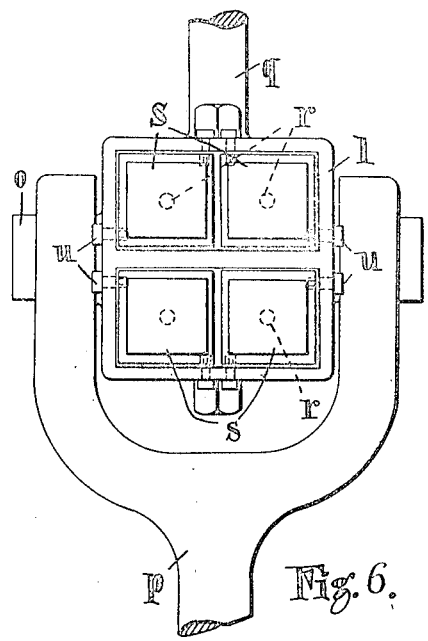
Figure 5:
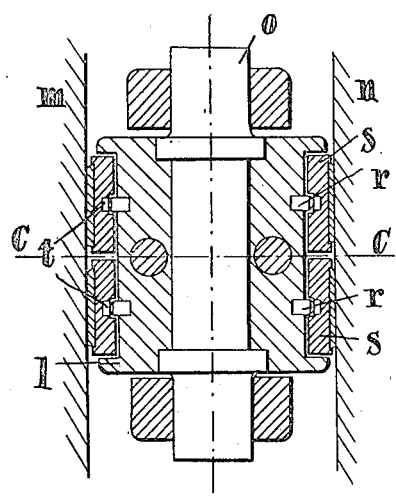

Referring now to the accompanying drawings:—Figure 1 represents partly in elevation and partly in section a marine thrust block according to the present invention. Fig. 2 is an end view of the same partly in elevation and partly in section, the latter being taken on the line A A of Fig. 1, in the direction of the arrow, 1. The sectional view in Fig. 1 is taken on the line B B of Fig. 2. Fig. 3 is an enlarged view showing the method of supporting the pressure blocks upon the carrying member. Fig. 4 is a view of a slide for a reciprocating engine according to the present invention. This figure is a sectional view on the line C C of Fig. 5. Fig. 5 is a sectional view on the line D D of Fig. 4, while Fig. 6 is a side elevation of the slide.

In carrying this invention into effect as shown in Figs. 1 to 3, the shaft $a$, is provided with a flange $b$, the sides of which form the thrust or bearing faces. The thrust block comprises a casing divided horizontally into two parts, $c$ and $d$. Both parts are provided with a spherically-shaped portion in which rests the correspondingly shaped part of a carrying member, $e$. This spherical contacting surface is indicated by the letter $f$. The carrying member $e$, carries the brasses, $g\ g$, of a bearing surrounding the shaft, $a$. One face of the carrying member $e$, is substantially parallel to the face of the thrust collar, $b$, of the shaft, $a$. This face is recessed as shown to take three pressure blocks, $h$. At the back of each of these recesses is bored a hole into which are inserted pins, $i$, having flat surfaces preferably projecting slightly above the surface of the carrying member, $e$; the exposed face of each of these pins, $i$, is preferably case-hardened. Each of the bearing or pressure blocks, $h$, in its rear face has a similar hole formed in it, and a similar pin $j$, inserted therein. The exposed face of this pin projects above the surface of the pressure block, $h$, and is rounded so as to form a spherical surface, this face being also preferably case-hardened.

Fig. 3 shows portions of a pressure block, $h$, and carrying member $e$, with the respective pins, $j$ and $i$, inserted therein, from which the contact of the spherical surface of the pin, $j$, on the flat surface of the pin $i$, is easily seen. Pressure blocks, $h$, supported in this manner may be provided on both sides of the thrust collar, $b$, in cases, such as the one described when the thrust forces on the shaft may act in either direction.

It will be seen that by this invention each bearing or pressure block $h$, is spherically pivoted upon the carrying member, $e$, and is free to move about any axis passing through the point of contact of the spherical face of the pin $j$, upon the flat face of the pin $i$. Thus each pressure block $h$, is free to adjust itself to the face of the thrust collar $b$, on the shaft $a$, with which it contacts, notwithstanding any irregularities which may exist or arise in the alinement of the supporting structures of the thrust block in relation to the moving surfaces. In this manner the pressure between the contacting surfaces is uniformly distributed over each pressure block $h$, in a radial direction, notwithstanding any such want of alinement. Further, the spherical seating of the carrying member, $e$, upon the parts $c\ d$, of the outer casing provides still further accommodation for inequalities of alinement, and enables the total pressure to be uniformly distributed between the various pressure blocks. Thus, a very uniform distribution of pressure not only between the blocks but also over the surface of each block is obtained by this invention. Further, as illustrated in this instance, each point of support may lie in the radial line which bisects the area of the contacting surface of the pressure block, so that the direction of relative motion may be changed, and the thrust block be made applicable to conditions in which the direction of rotation of the shaft is liable to be reversed.

Lubricant may be admitted to the thrust block in any convenient manner, and will be drawn in between the contacting surfaces of the thrust collar $b$, and the faces of the bearing or pressure blocks, $h$; the lubricant will then form a film between these contacting surfaces, which film will be thicker at the leading edge of the block $h$, than at its trailing edge. Moreover, as the pressure between the contacting surfaces is uniform in a radial direction this film will be of constant thickness in a radial line across the pressure block. In this manner, as above remarked, the pressure on the pivoted blocks is more uniformly distributed.

The invention is also applicable to bearings such as the slides of a reciprocating engine or to the thrust blocks of locomotive engines or steamships, and to other bearings generally.

The application of the invention to the first-mentioned purpose is shown in Figs. 4, 5 and 6. In these figures is shown a slipper $l$, of a reciprocating engine moving between the guides $m$, $n$. This slipper is provided with a pin, $o$, on which is mounted the connecting rod, $p$, the piston rod being represented by the letter $q$. Each face of the slipper in contact with a guide is recessed, and four pins, $r$, let into the face of this recess; the projecting ends of these pins are rounded to a spherical surface and preferably case-hardened. Pressure plates $s$, are placed in the recessed surface of the slipper $l$, each of these plates being recessed on its under side into which recess is placed a case-hardened pin, $t$, the face of which is slightly below the face of its respective pressure plate. The projecting spherical end of the pin $r$, contacts with the surface of the case-hardened pin $t$, in one of the pressure plates $s$. In this way, each of the pressure plates, $s$, can move about any axis passing through the point of contact of the pin $r$, upon the pin $s$. Screws $u$, may be provided, if desired, to prevent the pressure plates $s$, from revolving about the axis of the pins $r$. Such screws $u$, project into corresponding holes in the pressure plates $s$, suitable clearance, however, being allowed.

As illustrated, four pressure plates, $s$, are provided on each face of the slipper $l$, this or a larger number being desirable to prevent any tendency of the piston rod $q$, to turn about its axis. Any number and arrangement of plates may, however, be adopted.

The details of construction necessary in carrying this invention into effect may, of course, be varied, without in any way departing from the spirit of the same.

Having now described my invention, what I claim as new and desire to secure by Letters Patent is:—

In combination a non-rotating element having a flat face and a spherical surface upon its back, said flat face being adapted to support a member in sliding contact therewith, a second element having a flat surface, said flat surface co-acting with said spherical surface to form a fulcrum about which said element can rock.

In testimony whereof, I affix my signature in presence of two witnesses.

CHARLES ALGERNON PARSONS.

Witnesses:
 FREDERICK JORDON HAY BEDFORD,
 ALBERT WILLIAM PARR.